(12) United States Patent
Nakazono et al.

(10) Patent No.: US 7,610,421 B2
(45) Date of Patent: Oct. 27, 2009

(54) BUS REQUEST CONTROL CIRCUIT

(75) Inventors: Keisuke Nakazono, Hino (JP); Akira Ueno, Akiruno (JP)

(73) Assignee: Olympus Corporation, Tokyo (JP)

( * ) Notice: Subject to any disclaimer, the term of this patent is extended or adjusted under 35 U.S.C. 154(b) by 79 days.

(21) Appl. No.: 11/174,217

(22) Filed: Jul. 1, 2005

(65) Prior Publication Data
US 2006/0020728 A1   Jan. 26, 2006

(30) Foreign Application Priority Data
Jul. 22, 2004   (JP)   ............... 2004-214678

(51) Int. Cl.
G06F 13/00   (2006.01)
G06F 13/42   (2006.01)

(52) U.S. Cl. ............... 710/107; 710/106; 710/111; 710/112

(58) Field of Classification Search ............... 710/106, 710/107, 111, 112
See application file for complete search history.

(56) References Cited
U.S. PATENT DOCUMENTS 5,277,426 A * 1/1994 Gerpheide et al. .......... 473/199
5,301,279 A * 4/1994 Riley et al. .................... 710/41
6,751,034 B1 * 6/2004 Bloodworth et al. .......... 360/46
7,240,157 B2 * 7/2007 Frank et al. ................. 711/118

FOREIGN PATENT DOCUMENTS

JP   2000-92375   3/2000

* cited by examiner

Primary Examiner—Mark Rinehart
Assistant Examiner—Jeremy S Cerullo
(74) Attorney, Agent, or Firm—Straub and Pokotylo; John C. Pokotylo

(57) ABSTRACT

A bus request control circuit provided in a signal processing circuit having a higher priority in an arbitration circuit includes a request signal transmitting section which transmits a request signal to request a bus right to the arbitration circuit. A request acknowledge signal receiving section receives a request acknowledge signal transmitted from the arbitration circuit in response to the request signal transmitted to the arbitration circuit. Further, the request signal from the request signal transmitting section is transmitted after lapse of a predetermined time since reception of the request acknowledge signal.

6 Claims, 3 Drawing Sheets

BUS REQUEST CONTROL CIRCUIT

CROSS-REFERENCE TO RELATED APPLICATIONS

This application is based upon and claims the benefit of priority from prior Japanese Patent Application No. 2004-214678, filed Jul. 22, 2004, the entire contents of which are incorporated herein by reference.

BACKGROUND OF THE INVENTION

1. Field of the Invention

The present invention relates to a bus request control circuit which controls transmission of a request signal to request a right to use a bus.

2. Description of the Related Art

As a method of controlling access to a memory, proposed is a signal processing apparatus in Jpn. Pat. Appln. KOKAI Pub. No. 2000-92375. In the apparatus, when request signals are received from various signal processing circuits (called "master") connected to a memory controller via buses, the memory controller selects a master having the highest-priority from the masters which outputted a request signal, and supplies image data written in the image memory to the selected master to allow the master to perform signal processing.

The above method is further explained. Each master usually has a buffer memory for temporarily storing data read from and/or to be written in the memory, and issues a request for access to the memory, according to the free space of the buffer memory. Specifically, if the buffer memory has a free space, the master issues the request signal and stores data read from the memory in a buffer memory. A bus request control circuit provided in each of the masters performs control of output of such a request signal.

The bus request control circuit (SDRAM bus interface) has a structure as shown in FIG. 5, for example. The bus request control circuit illustrated in FIG. 5 comprises a NOR circuit 101 and a flip-flop circuit 102. In the bus request control circuit of FIG. 5, the NOR circuit 101 is connected with an input section for a signal indicating available space of the buffer memory (hereinafter referred to as "buffer state signal") and an output section of the flip-flop circuit 102. An output section of the NOR circuit 101 is connected to a set (set) terminal of the flip-flop circuit 102. An input section for a request acknowledge signal from a memory controller (not shown) is connected to a reset (rst) terminal of the flip-flop circuit 102.

The bus request control circuit having the above structure operates as follows. For example, supposing that a buffer state signal when the buffer memory is full is "1", the NOR circuit 101 outputs "1" only if both the buffer state signal and the output of the flip-flop circuit 102 are "0". When the NOR circuit 101 outputs "1", the flip-flop circuit 102 outputs "1", and transmission of a request signal is permitted. When a request acknowledge signal is input to the flip-flop circuit 102, the output of the flip-flop circuit 102 is reset to "0". Thereby, the master checks again whether the buffer memory has an available space, and issues a request signal if the buffer memory still has an available space. This operation is illustrated in the timing chart of FIG. 6. Specifically, a bus request control circuit having a structure as shown in FIG. 5 continuously transmits a request signal as long as the buffer memory has an available space.

BRIEF SUMMARY OF THE INVENTION

According to a first aspect of the present invention, there is provided a bus request control circuit provided in a signal processing circuit having a higher priority in an arbitration circuit, the bus request control circuit comprising:

a request signal transmitting section which transmits a request signal to request a bus right to the arbitration circuit; and a request acknowledge signal receiving section which receives a request acknowledge signal transmitted from the arbitration circuit in response to the request signal transmitted to the arbitration circuit, wherein transmission of the request signal from the request signal transmitting section is performed after lapse of a predetermined time since reception of the request acknowledge signal.

According to a second aspect of the present invention, there is provided a bus request control circuit provided in a signal processing circuit having a higher priority in an arbitration circuit, the bus request control circuit comprising:

a request signal transmitting section which transmits a request signal to request a bus right to the arbitration circuit; and a request acknowledge signal receiving section which receives a request acknowledge signal transmitted from the arbitration circuit in response to the request signal transmitted to the arbitration circuit, a first disabling section which disables transmission of the request signal to the arbitration circuit if a buffer memory provided in the signal processing circuit has no available space;

a counting section which starts counting upon reception of the request acknowledge signal, and ends the counting when the counting section counts to an upper limited value of a counting value;

a second disabling section which disables transmission of the request signal to the arbitration circuit during a period from reception of the request acknowledge signal to end of the counting by the counting section; and a permitting section which permits transmission of the request signal to the arbitration circuit, only if disablement of transmission of the request signal is released in the first disabling section and the second disabling section.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention is explained with reference to drawings.

Figure 1:
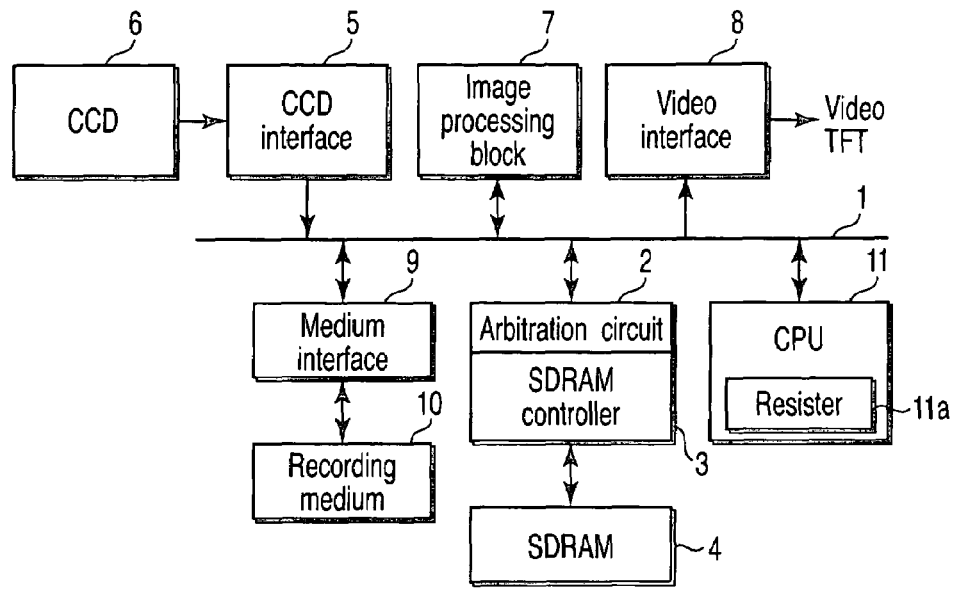
FIG. 1 is a block diagram illustrating an internal structure of an electronic camera for explaining a bus request control circuit according to an embodiment of the present invention.

FIG. 1 is a block diagram illustrating an internal structure of an electronic camera for explaining an embodiment of the present invention.

In FIG. 1, an arbitration circuit 2 is connected to a shared bus 1. Further, the shared bus 1 is connected with a plurality of masters, such as a CCD interface 5, an image processing block 7, a video interface 8, a medium interface 9, and a CPU 11.

When receiving request signals (hereinafter referred to as "Req signal") from the masters shown in FIG. 1, the arbitration circuit 2 provides a bus right to a master having the highest priority, in view of priorities of the masters. In this operation, the arbitration circuit 2 sends a request acknowledge signal (hereinafter referred to as "Ack signal") in return to the master to be provided with the bus right. Further, if the request from the master is a request for reading data, the arbitration circuit 2 reads image data stored in a predetermined address of a memory (SDRAM) 4 via an SDRAM controller 3, and outputs the read image data (read data) together with a data valid signal (hereinafter referred to as "Valid signal").

A CCD 6 is connected to the CCD interface 5. The CCD 6 obtains an imaging signal by performing photoelectric conversion of an object beam imaged by an imaging optical system (not shown). The imaging signal obtained by the CCD 6 is preprocessed by a preprocessing circuit (not shown). Image data obtained by preprocessing is written in the SDRAM 4 through the CCD interface 5.

The image processing block 7 reads image data from the SDRAM 4, and performs known image processing to the read image data. The image data processed in the image processing block 7 is written in the SDRAM 4 again.

The video interface 8 is connected with a display device such as a TFT display, with a video encoder (not shown) interposed therebetween. The video interface 8 reads image data written in the SDRAM 4, in accordance with a synchronizing signal from the video encoder. The video encoder converts image data read via the video interface 8 into an video signal such as an NTSC signal, and enables display of an image on the display device such as a TFT display.

The medium interface 9 is connected with a recording medium 10 such as a memory card. The medium interface 9 reads image data written in the SDRAM 4, and stores the read image data in the recording medium 10.

The CPU 11 performs centralized control of the electronic camera. Various data in performing control by the CPU 11 are read from or written in the SDRAM 4. Further, the CPU 11 has a register 11a, which holds register setting values, such as a request interval, detailed below.

Figure 2:
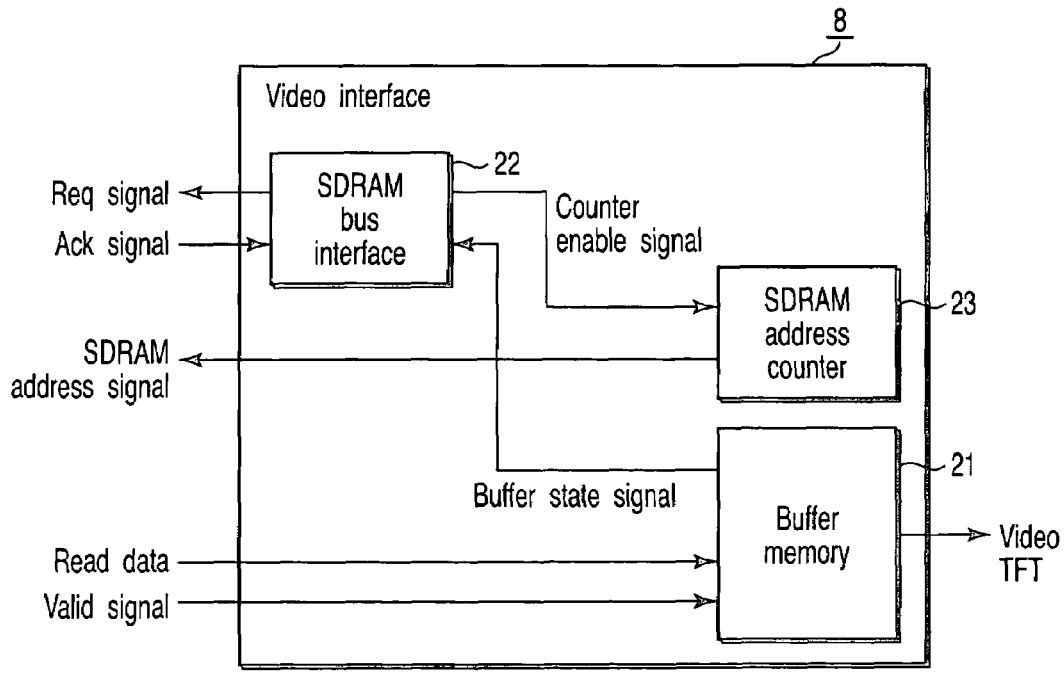
FIG. 2 is a diagram illustrating an internal structure of a video interface for explaining the bus request control circuit according to the embodiment of the present invention.

FIG. 2 is a diagram illustrating an internal structure of the video interface 8. In FIG. 2, the video interface 8 includes a buffer memory 21, an SDRAM bus interface 22 serving as a bus request control circuit, and an SDRAM address counter 23.

The buffer memory 21 is a buffer memory for temporarily storing read data (image data) read from the SDRAM 4. Further, the buffer memory 21 receives a Valid signal from the SDRAM controller 3, determines a valid part of the read data read from the SDRAM 4, and stores data of the valid part. The buffer memory 21 also transmits a buffer state signal indicating the state of the available space of the buffer memory to the SDRAM bus interface 22.

As the buffer memory of the video interface 8, a buffer memory of a relatively large capacity is used such that image data can be transmitted to the video encoder in real time.

The SDRAM bus interface 22 transmits a Req signal to the arbitration circuit 2, according to the state of the available space of the buffer memory 21. Further, the SDRAM bus interface 22 transmits a counter enable signal to the SDRAM address counter 23. The SDRAM address counter 23 receives a counter enable signal from the SDRAM bus interface 22, and transmits an SDRAM address signal designating an address, in which data to be read from the SDRAM 4 is stored, to the arbitration circuit 2.

Figure 3:
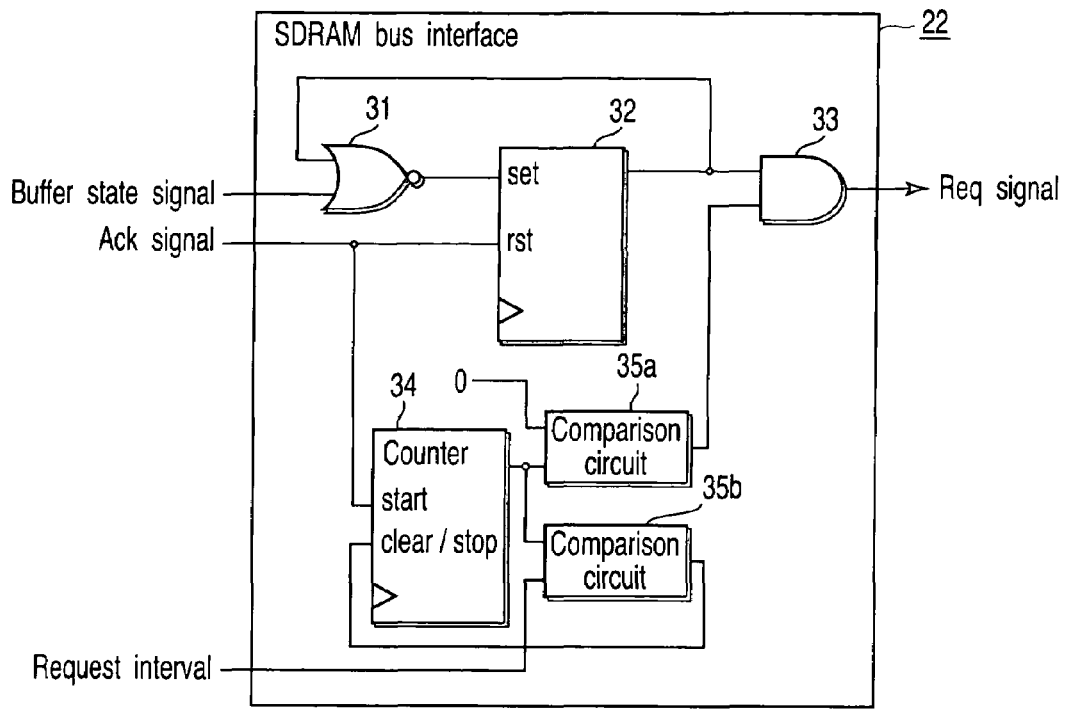
FIG. 3 is a diagram illustrating a structure of an SDRAM bus interface serving as the bus request control circuit according to the embodiment of the present invention.

FIG. 3 is a diagram illustrating an internal structure of the SDRAM bus interface 22 according to this embodiment. The SDRAM bus interface 22 shown in FIG. 3 comprises a NOR circuit 31, a flip-flop circuit 32, an AND circuit 33, a counter 34, and comparison circuits 35a and 35b. In the SDRAM bus interface 22 shown in FIG. 3, an input section of the NOR circuit 31 serving as a disabling section is connected with an input section for the buffer state signal and an output section of the flip-flop circuit 32. Further, an output section of the NOR circuit 31 is connected to a set terminal of the flip-flop circuit 32, and an input section for an Ack signal from the arbitration circuit 2 is connected to a rst terminal of the flip-flop circuit 32. The output section of the flip-flop circuit 32 is also connected to one of input sections of the AND circuit serving as a permitting section.

In FIG. 3, a start (Start) terminal of the counter 34 serving as a counting section is connected with the input section for an Ack signal from the arbitration circuit 2. An output section of the counter 34 is connected to one of input sections of the comparison circuit 35a and one of input sections of the comparison circuit 35b.

The comparison circuit 35a compares the output of the counter 34 with 0 to determine whether they agree. An output section of the comparison circuit 35a is connected to the other input section of the AND circuit 33. The comparison circuit 35b compares the output of the counter 34 with a request interval to determine whether they agree. The request interval is a register setting value held in the register 11a in the CPU 11. An output section of the comparison circuit 35b is connected to a clear/stop (clear/stop) terminal of the counter 34.

The request interval is a value for setting a period from acknowledgement of the Req signal transmitted to the arbitration circuit 2 (reception of an Ack signal) to transmission of a next Req signal by the SDRAM bus interface 22. In this embodiment, transmission of a Req signal is disabled during a request interval period, even if the buffer memory has an available space. Further, even in a time period other than a request interval period, transmission of a Req signal is also disabled if the buffer memory has no available space.

The SDRAM bus interface 22 having the above structure operates as follows. For example, supposing that the buffer state signal when the buffer memory is full is "1", the NOR circuit 31 outputs "1" only if both the buffer state signal and the output of the flip-flop circuit 32 are "0". When the NOR circuit 31 outputs "1", the flip-flop circuit 32 outputs "1" to the AND circuit 33.

In the meantime, the counter 34 starts counting in response to an Ack signal. The comparison circuits 35a and 35b compare the output value of the counter 34 with their respective preset values. The flip-flop circuit 32 outputs "0" to the AND circuit 33, in response to the Ack signal.

The comparison circuit 35a compares the output of the counter 34 with its preset value "0", and outputs "1"to the AND circuit 33 only if the output of the counter 34 is "0". In this case, if the output of the flip-flop circuit 32 is "1", the AND circuit 33 outputs "1". Consequently, transmission of a Req signal is permitted.

Further, the comparison circuit 35b compares the output of the counter 34 with the request interval being a register setting value, and outputs "1" only if the output of the counter 34 agrees with the request interval. Thereby, the counter 34 stops counting, and the output of the counter 34 is reset to 0.

Figure 4:
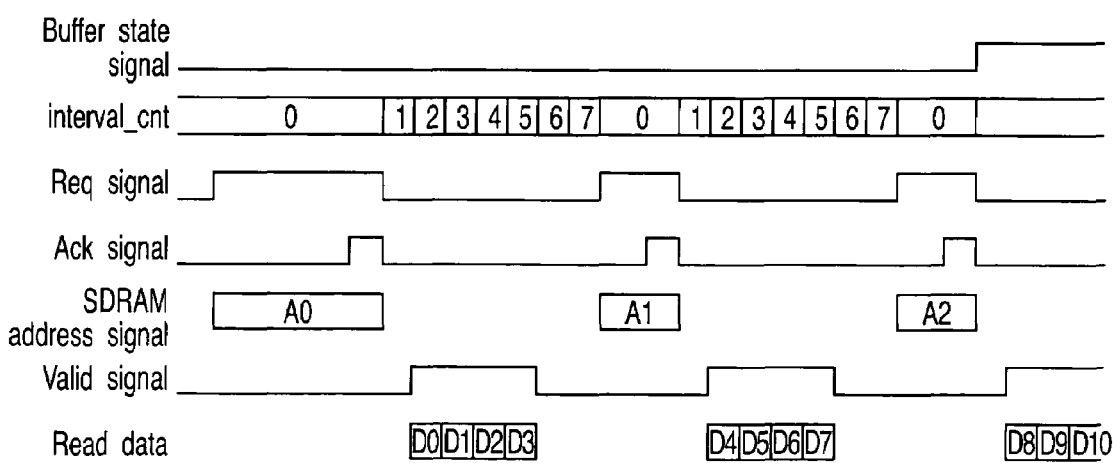
FIG. 4 is a timing chart for illustrating operation of the video interface.
Figure 5:
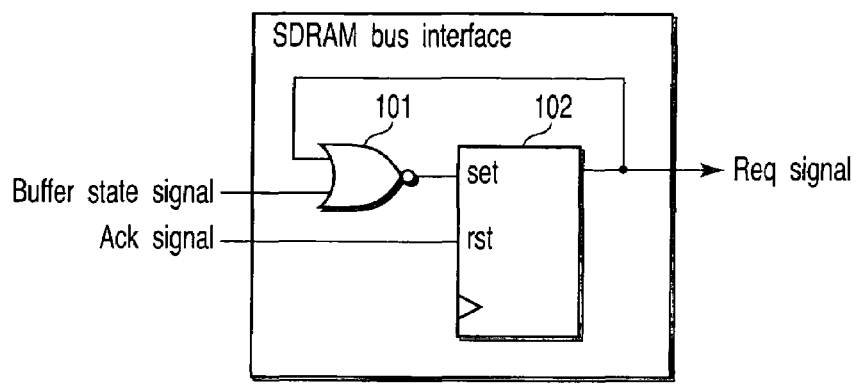
FIG. 5 is a diagram illustrating a structure of a bus request control circuit of prior art.
Figure 6:
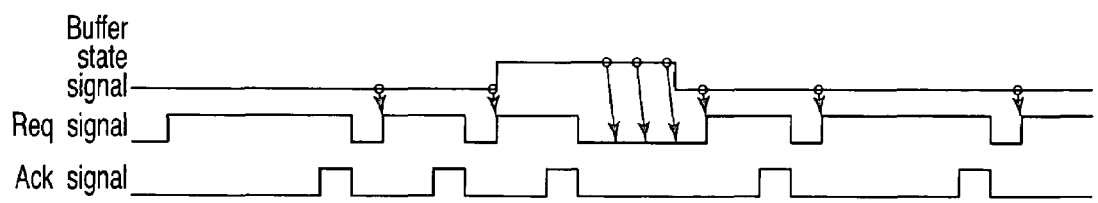
FIG. 6 is a timing chart for illustrating operation of the bus request control circuit of prior art.

The above operation is illustrated in a timing chart of FIG. 4. FIG. 4 also illustrates timing of each of an SDRAM address signal transmitted to the arbitration circuit 2 together with a Req. signal, read data read from the SDRAM 4, and a Valid signal. As shown in FIG. 4, according to this embodiment, transmission of a Req signal is not permitted even in a period in which the buffer memory has an available space and the disabled state of transmission of a Req signal in the NOR circuit 31 is released, if the period falls within a request interval period (the period "interval_cnt" in FIG. 4). Therefore, the arbitration circuit 2 can provide a bus right to another master having a lower priority during the request interval period.

In the example shown in FIG. 4, the value of the request interval is 7, that is, a setting value of the register 11a is set to 7. The setting value is an adjustable value, and can be changed according to specifications of the product, etc.

Although the present invention has been explained above based on an embodiment, the present invention is not limited to the above embodiment, but various modifications and applications are possible as a matter of course within the range of the gist of the present invention.

For example, although operation of the bus request control circuit is explained in the above embodiment with an example of a video interface having a buffer memory, the above technique of the bus request control circuit is also applicable to a master having no buffer memory. Further, it is needless to say that the bus request control circuit explained in the embodiment is also applicable to apparatuses other than electronic cameras. However, please note that the technique of the embodiment of the present invention is particularly effective when applied to a master such as a video interface, which has a higher priority to the arbitration circuit and has a buffer memory of a relatively large capacity.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A bus request control circuit provided in a signal processing circuit having highest priority of a plurality of processing circuits connected to an arbitration circuit, the bus request control circuit comprising:

a request signal transmitting section which transmits a request signal to request a bus right to the arbitration circuit;

a request acknowledge signal receiving section which receives a request acknowledge signal transmitted from the arbitration circuit in response to the request signal transmitted to the arbitration circuit;

a large-capacity buffer memory to store data read from a memory; and a counting section which performs counting to measure time required for a signal processing circuit having a low priority in the arbitration circuit to request the bus right to the arbitration circuit, wherein when the buffer memory has free space for storing data, transmission of a next request signal from the request signal transmitting section is performed after the counting section ends the counting, and wherein a request for the bus right by the signal processing circuit having a low priority made anytime during the counting by the counting section is ensured priority over a request for the bus right by the signal processing circuit having highest priority.

2. A bus request control circuit according to claim 1, wherein the counting section starts counting upon reception of the request acknowledge signal, and ends the counting when the counting section counts to an upper limited value of a counting value.

3. A bus request control circuit according to claim 1, wherein the counting section starts counting upon reception of the request acknowledge signal, and ends the counting when the counting section counts to an upper limited value of a counting value, wherein the upper limit value of the counting value of the counting section is set as a register setting value.

4. A bus request control circuit provided in a signal processing circuit having a highest priority of a plurality of processing circuits connected to an arbitration circuit, the bus request control circuit comprising;

a request signal transmitting section which transmits a request signal to request a bus right to the arbitration circuit;

a large-capacity buffer memory to store data read from a memory;

a request acknowledge signal receiving section which receives a request acknowledge signal transmitted from the arbitration circuit in response to the request signal transmitted to the arbitration circuit;

a first disabling section which disables transmission of the request signal to the arbitration circuit if a buffer memory provided in the signal processing circuit has no available space;

a counting section which starts counting upon reception of the request acknowledge signal, and ends the counting when the counting section counts to an upper limited value of a counting value;

a second disabling section which disables transmission of a next request signal to the arbitration circuit during a period from reception of the request acknowledge signal in response to the request signal to end of the counting by the counting section; and a permitting section which permits transmission of the next request signal to the arbitration circuit, only if transmission of the request signal disabled by the first disabling section is enabled and transmission of the next request signal disabled by the second disabling section is enabled, wherein a request for the bus right by the signal processing circuit having a low priority made anytime during the counting by the counting section is ensured priority over a request for the bus right by the signal processing circuit having highest priority.

5. A bus request control circuit according to claim 4, wherein
the upper limit value of the counting value of the counting section is set as a register setting value.

6. A bus request control circuit provided in a signal processing circuit having a highest priority of a plurality of processing circuits connected to an arbitration circuit, the bus request control circuit comprising:
a request signal transmitting section which transmits a request signal to request a bus right to the arbitration circuit;
a request acknowledge signal receiving section which receives a request acknowledge signal transmitted from the arbitration circuit in response to the request signal transmitted to the arbitration circuit;
a large-capacity buffer memory to store data read from a memory; and
a counting section which performs counting to measure time required for a signal processing circuit having a low priority in the arbitration circuit to request the bus right to the arbitration circuit,
wherein transmission of a next request signal from the request signal transmitting section cannot be performed until the counting section ends the counting when the buffer memory has free space for storing data, and
wherein a request for the bus right by the signal processing circuit having a low priority made anytime during the counting by the counting section is ensured priority over a request for the bus right by the signal processing circuit having highest priority.

* * * * *